(12) United States Patent
Baker et al.

(10) Patent No.: US 8,104,311 B2
(45) Date of Patent: Jan. 31, 2012

(54) ROTARY FIBERIZATION PROCESS FOR MAKING GLASS FIBERS, AN INSULATION MAT, AND PIPE INSULATION

(75) Inventors: John Wayne Baker, Littleton, CO (US); Rodney Roger Smalley, Richmond, IN (US); Alessandro G. Borsa, Evergreen, CO (US); Kenneth Charles Fitzpatrick, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 1096 days.

(21) Appl. No.: 11/430,459

(22) Filed: May 9, 2006

(65) Prior Publication Data

US 2007/0261446 A1    Nov. 15, 2007

(51) Int. Cl.
*C03B 37/04*    (2006.01)
(52) U.S. Cl. ........... 65/460; 65/454; 65/455; 65/456; 65/459; 65/462; 65/465; 65/466; 65/468
(58) Field of Classification Search .......... 65/453–460, 65/464–468
See application file for complete search history.

(56) References Cited

U.S. PATENT DOCUMENTS

| | | | | |
|---|---|---|---|---|
| 2,897,874 | A | * | 8/1959 | Stalego et al. ............ 65/450 |
| 2,931,062 | A | * | 4/1960 | Leaman ............ 65/374.12 |
| 2,931,422 | A | * | 4/1960 | Long ................ 65/450 |
| 3,084,525 | A |   | 4/1963 | Levecque et al. |
| 3,088,573 | A | * | 5/1963 | Tkacs ................ 425/393 |
| 3,254,977 | A |   | 6/1966 | Levecque et al. |
| 3,304,164 | A |   | 2/1967 | Charpentier et al. |
| 3,395,005 | A | * | 7/1968 | Stelmah ............ 65/460 |
| 3,523,774 | A |   | 8/1970 | Kleist |
| 3,759,680 | A | * | 9/1973 | Kleist ............ 65/461 |
| 3,785,791 | A |   | 1/1974 | Perry |
| 3,867,119 | A |   | 2/1975 | Kasuga et al. |
| 3,928,009 | A |   | 12/1975 | Perry |
| 4,046,539 | A | * | 9/1977 | Pitt ................ 65/458 |
| 4,153,455 | A |   | 5/1979 | Eiselstein et al. |
| 4,197,103 | A |   | 4/1980 | Ishikawa et al. |
| 4,229,198 | A |   | 10/1980 | Coggin, Jr. et al. |
| 4,246,017 | A |   | 1/1981 | Phillips |
| 4,392,878 | A |   | 7/1983 | Okuma et al. |
| 4,392,879 | A |   | 7/1983 | Takeuchi et al. |
| 4,532,105 | A |   | 7/1985 | Kunioka et al. |
| 4,698,083 | A |   | 10/1987 | Shioura et al. |

(Continued)

FOREIGN PATENT DOCUMENTS

DE    1812162    12/1968

(Continued)

*Primary Examiner* — Queenie Dehghan
(74) *Attorney, Agent, or Firm* — Robert D. Touslee

(57) ABSTRACT

Tubular pipe insulation is made from a glass fiber mat produced utilizing a rotary glass fiberization process. A spinner disc is rotated to centrifuge molten glass through fiberization holes in an annular sidewall of the spinner disc and form primary glass fibers. The primary glass fibers are attenuated and formed into a veil where the fibers are dispersed to reduce in length the fiber networks formed from the fibers. Binder is applied to the fibers and the fibers are collected into a mat that, when pulled apart by longitudinally directed, opposing forces, separates across the width of the mat into two mat sections having feathered edges with substantially no fibrous stringers extending beyond the feathered edges for a distance greater than about four inches. The leading mat section is then wound about a mandrel and the binder in the mat is cured to form the pipe insulation.

26 Claims, 5 Drawing Sheets

U.S. PATENT DOCUMENTS

| | | | |
|---|---|---|---|
| 4,759,784 A | | 7/1988 | Shono et al. |
| 5,017,205 A | | 5/1991 | Shioura et al. |
| 5,139,551 A | * | 8/1992 | Yamatsuta et al. .............. 65/21.2 |
| 5,154,746 A | | 10/1992 | Okuma et al. |
| 5,176,729 A | | 1/1993 | Bernard et al. |
| 5,277,706 A | | 1/1994 | Blandin et al. |
| 5,314,521 A | | 5/1994 | Lewis et al. |
| 5,326,241 A | | 7/1994 | Rook et al. |
| 5,364,431 A | | 11/1994 | Lewis et al. |
| 5,462,571 A | | 10/1995 | Taguchi et al. |
| 5,601,628 A | | 2/1997 | Battigelli et al. |
| 5,660,798 A | | 8/1997 | Doshi et al. |
| 5,688,302 A | * | 11/1997 | Snyder .............................. 65/461 |
| 5,785,996 A | | 7/1998 | Snyder |
| 5,900,037 A | | 5/1999 | Yang et al. |
| 5,932,499 A | * | 8/1999 | Xu et al. ........................ 501/35 |
| 6,158,249 A | | 12/2000 | Battigelli et al. |
| 6,227,009 B1 | * | 5/2001 | Cusick et al. ................... 65/460 |
| 6,453,703 B1 | * | 9/2002 | Johnson et al. ................. 65/459 |
| 6,543,258 B1 | | 4/2003 | Konno et al. |
| 6,596,048 B1 | | 7/2003 | Taffal et al. |
| 6,615,616 B2 | | 9/2003 | Konno et al. |
| 6,862,901 B1 | | 3/2005 | Otaki et al. |
| 2003/0196458 A1 | * | 10/2003 | Bennett ............................ 65/377 |
| 2004/0112093 A1 | * | 6/2004 | Beaufils et al. ................. 65/456 |

FOREIGN PATENT DOCUMENTS

| | | |
|---|---|---|
| FR | 2080414 | 1/1971 |
| FR | 2216237 | 1/1974 |
| GB | 2144115 | 2/1985 |
| JP | 10195566 | 7/1998 |
| JP | 2003267746 | 9/2003 |
| JP | 2004217437 | 8/2004 |
| WO | WO 01/19741 | 3/2001 |
| WO | WO 03/078340 | 9/2003 |
| WO | WO 2004/101459 | 11/2004 |

* cited by examiner

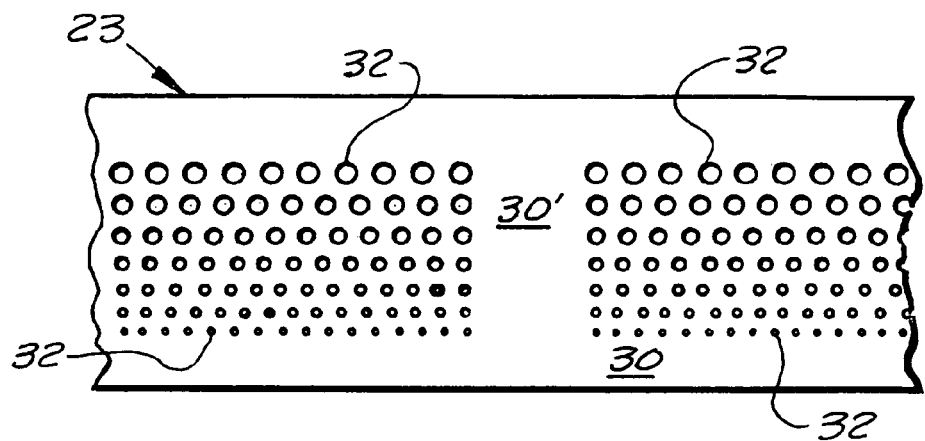
FIG. 4
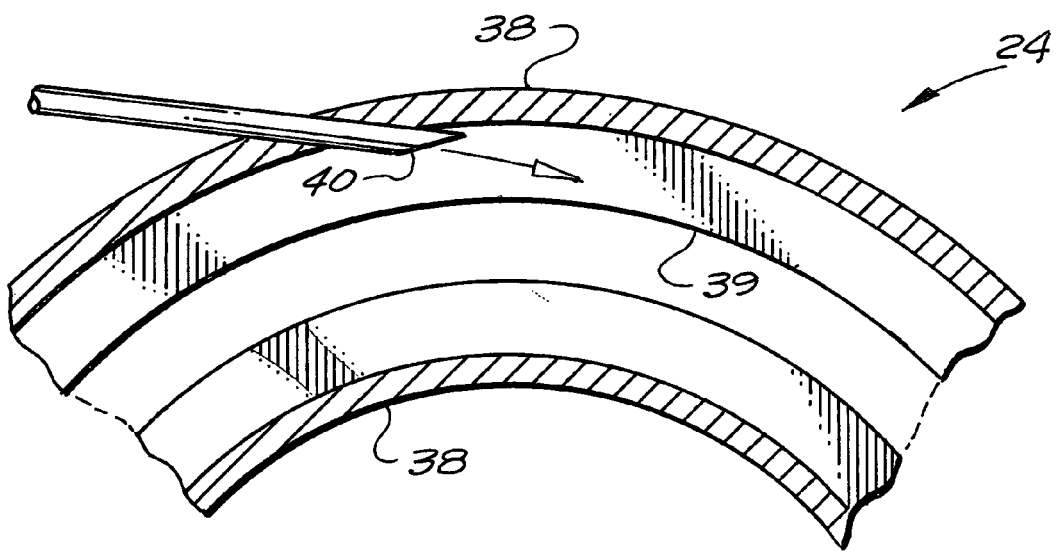
FIG. 5
FIG. 7

ated processing and/or finished product problems. For example, the presence of these stringers can adversely affect the winding the mat sections about the mandrels to form a tubular pipe insulation product through their entanglement with the winding apparatus and can adversely affect the appearance of the outer surface of the finished tubular pipe insulation product by making the outer surface of the product irregular. Furthermore, where the separated mat sections have relatively thick and/or ragged leading and trailing edges rather than generally straight feathered edges, the spiral winding of a mat section onto a mandrel to form a tubular pipe insulation product can leave a longitudinally extending ridge on the internal surface of the product that adversely affects the product's insulating properties and/or a longitudinally extending ridge on the external surface of the product that adversely affects the product's appearance.

ROTARY FIBERIZATION PROCESS FOR MAKING GLASS FIBERS, AN INSULATION MAT, AND PIPE INSULATION

BACKGROUND OF THE INVENTION

The subject invention relates to a process for making tubular glass fiber pipe insulation and more specifically, to an improved process for making tubular glass fiber pipe insulation that is made from a glass fiber mat produced utilizing a rotary glass fiberization process wherein the mat, when pulled apart by longitudinally directed, opposing forces, separates across the width of the mat into two mat sections having feathered edges with substantially no fibrous stringers extending beyond the feathered edges of the mat a distance greater than about four inches and typically no fibrous stringers extending beyond the feather edges of the mat a distance greater than about three inches.

Tubular glass fiber pipe insulation is typically made from a glass fiber mat containing uncured binder by winding the glass fiber mat about a mandrel and curing the binder. The glass fiber mat is typically made utilizing a process known in the industry as a pot and marble fiberization process or a process known in the industry as a rotary fiberization process. The glass fiber mat utilized from either of these processes typically contains fibers ranging between 5 and 8 microns in diameter rather than the finer diameter fibers normally used in products such as residential building insulation. The larger diameter glass fibers utilized in the glass fiber mats to produce tubular pipe insulation, at least in part, provide the finished tubular pipe insulation product with the feel expected and the rigidity required of the product by the insulation contractors. However, when making a glass fiber mat containing fibers ranging between 5 and 8 microns for forming tubular pipe insulation with a rotary fiberization process, a number of processing problems are encountered as illustrated by the following examples.

For the weight range of the mats that are used to make tubular pipe insulation and the downstream speed limitations of pipe insulation production processes, the pull rate per rotary fiberizer used to make the relatively large diameter glass fibers in the quantities required to be collected into such mats is relatively low when compared to the pull rates normally encountered in commercial rotary glass fiberization processes and can increase the difficulty of maintaining the energy balance required by the process to produce such glass fibers. The elevated glass viscosity of the molten glass used to make glass fibers for pipe insulation, compared to the glass viscosities typically used in other commercial rotary glass fiberization processes, increases the energy required to centrifuge the molten glass into fibers and limits the molten glass throughput through conventionally sized spinner fiberization holes. Furthermore, spinner alloy service temperature limitations inhibit raising the operating temperatures of the process as a means to compensate for and reduce this elevated viscosity.

Another issue that must be overcome when utilizing a rotary fiberization process is the networking of the glass fibers where the glass fibers produced by the process become entangled together prior to their collection into a mat to the extent that the process and mat produced by the process are adversely affected by the networked glass fibers. The accumulation of the glass fibers produced in the process into large networks of glass fibers can adversely affect the application of binder to the glass fibers and the collection of the glass fibers into a mat having a generally uniform fiber weight distribution and tear strength. When a mat containing networks of glass fibers that are too large is pulled apart during the process to separate the mat into mat sections that are successively wound about mandrels to form tubular pipe insulation, the networked glass fibers can adversely affect the uniform tearing of the mat so that the mat sections formed do not have generally straight feathered leading and trailing mat section edges and can form fibrous stringers extending beyond the leading and trailing edges of the mat sections for distances that cre

SUMMARY OF THE INVENTION

The process of the subject invention overcomes or ameliorates the processing problems discussed above that are encountered in the rotary fiberization and collection of glass fibers into a glass fiber mat which is subsequently separated into mat sections that are then formed into pieces of tubular pipe insulation. The process of the subject invention for making tubular pipe insulation: utilize a rotary glass fiberization apparatus to fiberize a high viscosity glass, apply binder to the glass fibers produced in the process, disperse the fibers produced in the process to reduce fiber networking, collect the fibers to form a mat, and separate the mat into mat sections with feathered leading and trailing edges. These mat sections are successively wrapped about cylindrical mandrels, the binder in the mat sections is cured after the mat sections are wrapped about the mandrels to form pieces of tubular pipe insulation, the pieces of tubular pipe insulation are slit and jacketed, and the jacketed tubular pipe insulation assemblies made by the process of the subject invention are packaged.

The rotary fiberization process of the subject invention utilizes a spinner disc with an annular peripheral sidewall having an upper annular edge portion, a lower annular edge portion, and a mid-portion extending between the upper and lower annular edge portions. The mid-portion of the annular spinner disc sidewall has thousands of glass fiberization holes therein that are between 0.016 and 0.035 inches in diameter. Preferably, an upper region of the mid-portion of the annular spinner disc sidewall has larger diameter glass fiberization holes than a lower region of the mid-portion of the annular sidewall and fewer glass fiberization holes per unit area than the lower region of the mid-portion of the annular sidewall to facilitate the formation of primary fibers across the height of the mid-portion of the sidewall within a narrower diameter range.

A molten glass is introduced into an interior of the spinner disc and onto a base of the spinner disc radially inward of the annular spinner disc sidewall at a rate between 120 pounds per hour and 900 pounds per hour. To reduce raw material costs, the molten glass has a viscosity of at least 1000 poise at about 1950° F. and a glass liquidus of about 1620° F. or greater. The spinner disc is rotated about a generally vertical axis of rotation and is rotated at speeds that centrifuge the molten glass through the glass fiberization holes in the annular spinner disc sidewall to form primary glass fibers and to pass the primary fibers through an annular heat bath region into an annular fluid attenuation region. Preferably the molten glass is centrifuged through the glass fiberization holes with a force between 900 and 1300 G's and at a rate that is between 0.015 and 0.060 pounds per hour per glass fiberization hole.

The annular heat bath region extends from the upper edge portion down through the mid-portion of the annular spinner disc sidewall and radially outward from the spinner disc sidewall to the annular fluid attenuation region. The annular heat bath region is heated by an annular external combustion burner that preferably heats the annular heat bath region with low velocity gases of combustion to provide a net heat flux into the primary glass fibers passing from the spinner disc through the annular heat bath region into the annular attenuation fluid region. To introduce more heat into a region above the spinner disc and into the annular heat bath region as well as heat the interior of the spinner, a fuel mixture having less oxygen than required for full combustion of the fuel within the spinner disc, can be introduced into the interior of the spinner disc. The combustion of this fuel mixture within the spinner disc heats the interior of the spinner disc to keep the molten glass in the spinner disc at a sufficiently high temperature for good fiberization and the fuel that does not burn within the spinner disc spills out over the upper peripheral edge of and out of the spinner disc where it combusts to add heat to a region over and adjacent the spinner disc including the heat bath region.

The annular fluid attenuation region is spaced radially outward from the spinner disc sidewall and extends from the upper edge portion down through the mid-portion of the annular sidewall of the spinner. An attenuation fluid is forcefully emitted from above into the annular fluid attenuation region. The forcefully emitted attenuation fluid attenuates the primary glass fibers introduced into the annular fluid attenuation region into lesser diameter glass fibers having diameters as low as 3 microns (typically between 5 microns and 8 microns) and directs those lesser diameter glass fibers downward away from the spinner disc in a generally tubular veil of the lesser diameter glass fibers and fiber networks formed from a portion of the lesser diameter glass fibers. In addition to the attenuation fluid, oxygen can be injected from above into and combusted in the annular fluid attenuation region to effect a relatively high localized temperature increase in a portion of the annular fluid attenuation region where there are high rates of shear attenuating the primary glass fibers into the lesser diameter glass fibers.

Preferably, the lesser diameter glass fibers of the tubular veil of lesser diameter glass fibers are dispersed by forcefully applying fluid onto the veil to reduce in size and length the fiber networks formed from the lesser diameter glass fibers. This dispersion of the lesser diameter glass fibers can be accomplished, at least in part, by forcefully emitting the attenuating fluid into the annular fluid attenuation region at alternating angles and/or in a non-uniform pattern. This dispersion of the lesser diameter glass fibers can also be accomplished, at least in part, by forcefully applying a binder and/or other fluid to the lesser diameter glass fibers of the tubular veil of lesser diameter glass fibers from within and/or outside of the tubular veil at a location or locations beneath the annular fluid attenuation region. Furthermore, all of these methods of fiber dispersion can be utilized together to attain the desired amount of lesser diameter fiber dispersion and can be combined with the use of a forming tube configured to effect fiber dispersion.

Preferably, the lesser diameter glass fibers are collected on a rotary collection drum into an insulation mat. The insulation mat, when pulled apart by longitudinally directed, opposing forces applied substantially equally to the mat across the width of the mat, separates across the width of the mat into two mat sections at a separation that has generally straight, feathered edges. Furthermore, the edges of the mat sections formed by the mat separation are not only feathered, but have no or substantially no fibrous stringers extending beyond either of the feathered edges of the mat sections a distance greater than about four inches. The mat sections are successively wrapped about mandrels with generally cylindrical outer surfaces and the binder in the wrapped mat sections is cured to form pieces of tubular pipe insulation with no longitudinally extending ridges and no or substantially no long stringers on the internal or external surfaces of the product that would adversely affect the product's insulating properties and/or appearance.

BRIEF DESCRIPTION OF THE DRAWINGS

FIGS. 2 and 3 schematically illustrate the direction of flow of combustion gases, oxygen injection, attenuating fluids, fiber dispersion fluids, and binder fluids.

FIG. 4 is a partial side view of the sidewall of the spinner disc of FIG. 2 schematically representing a preferred fiberizing hole and reinforcing band arrangement for the spinner disc.

FIG. 5 is a schematic partial horizontal cross section, viewed from above, of an annular external combustion burner of the fiberizing apparatus of FIG. 3.

FIGS. 7 and 8 are side and top views of a glass fiber mat section formed and used in the process of the subject invention to form a piece of tubular glass fiber pipe insulation.

DESCRIPTION OF THE PREFERRED EMBODIMENTS

Figure 1:
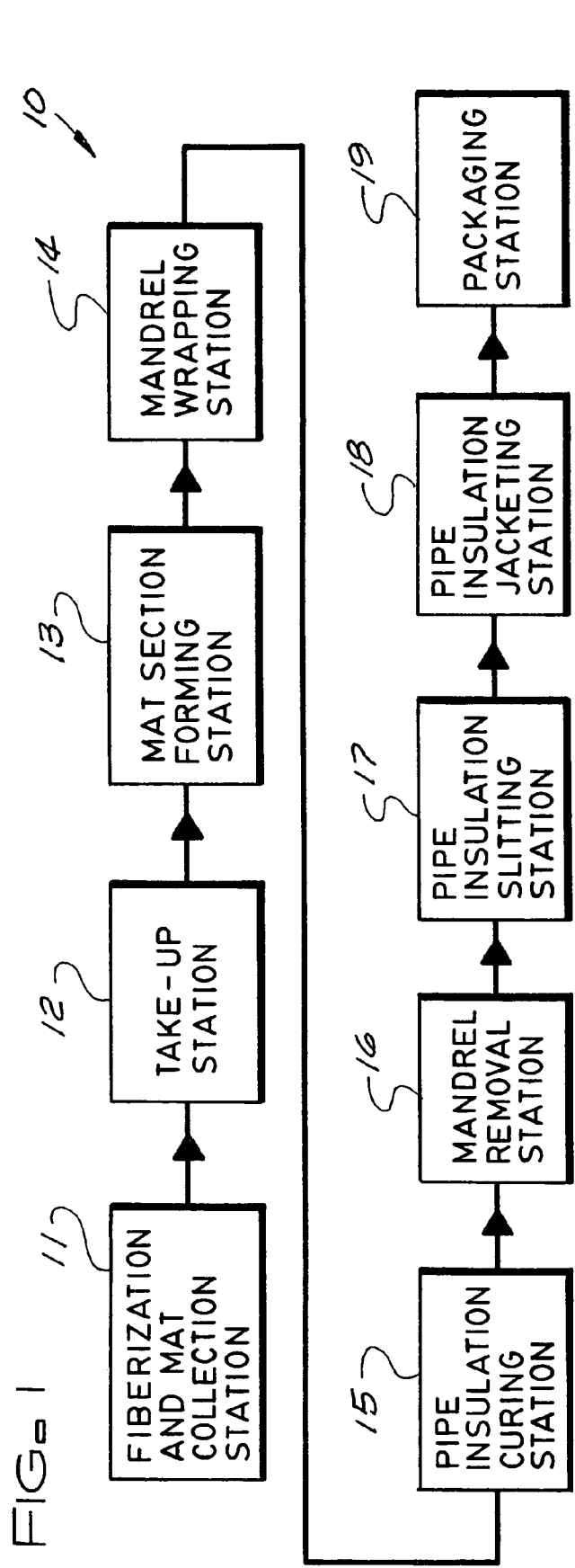
FIG. 1 is a schematic diagram of a tubular pipe insulation production line that may be used in the process of the subject invention.

FIG. 1 schematically shows a jacketed pipe insulation production line 10 for making jacketed tubular pipe insulation assemblies by the process of the subject invention. The jacketed pipe insulation production line 10 includes a glass fiberizing and mat collection station 11, a mat take-up station 12, a mat section forming station 13, a mandrel wrapping station 14, a curing station 15, a mandrel removal station 16, a pipe insulation slitting station 17, a pipe insulation jacketing station 18, and a packaging station 19.

Figure 2:
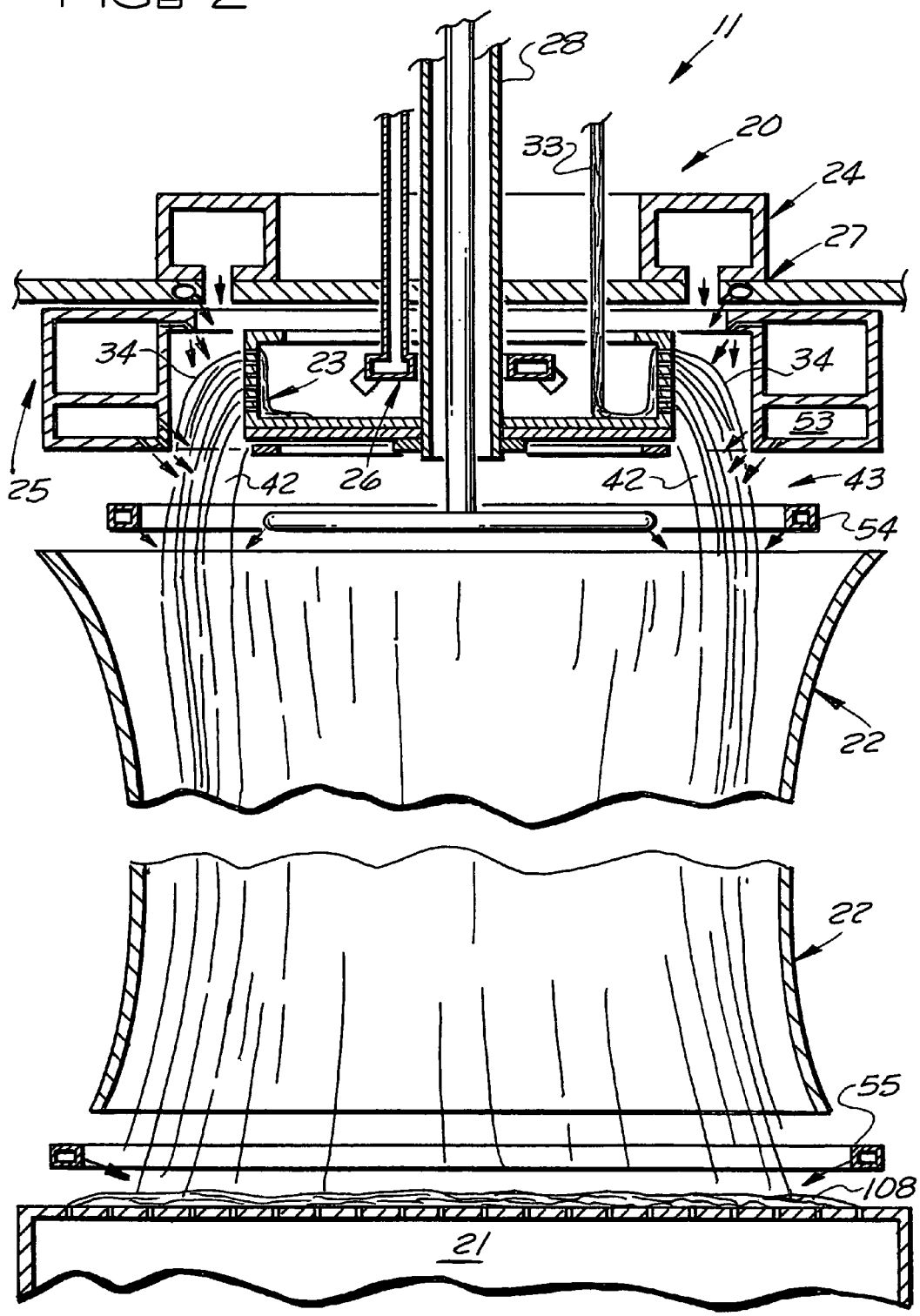
FIG. 2 is a schematic transverse vertical cross section through a glass fiberizing and mat collection station of a tubular pipe insulation production line that may be used in the process of the subject invention showing a rotary glass fiberizing apparatus, a binder application assembly, a collection tube, and a portion of a rotary collection drum for collecting a glass fiber mat.

In a preferred embodiment of the glass fiberizing and mat collection station 11 shown in FIG. 2, the glass fiberizing and mat collection station includes a rotary fiberizing apparatus 20, a rotary perforated mat collection drum 21, and a forming tube 22 through which the fibers formed by the rotary fiberizing apparatus 20 pass to be collected on the rotary mat collection drum 21. The rotary fiberizing apparatus 20 includes a spinner disc 23, an external burner 24, a fiber attenuation apparatus 25, and preferably, also includes an internal burner or burners 26 and an oxygen injection apparatus 27.

The spinner disc 23 of the rotary fiberizing apparatus is mounted on the lower end of a hollow drive shaft 28, which is driven by a conventional drive assembly (not shown) to rapidly rotate the spinner disc 23 about a vertical axis. The spinner disc 23 has a circular base plate 29 affixed to the hollow drive shaft 28, an integral annular peripheral sidewall 30 extending upward from an outer peripheral edge portion of the base plate 29, and an integral annular reinforcing flange 31 extending radially inward from an upper edge portion of the sidewall 30. The annular peripheral sidewall 30 has an upper annular edge portion that is free of fiberizing holes, a lower annular edge portion that is free of fiberizing holes, and a mid-portion extending between the upper and lower annular edge portions with thousands of fiberizing holes 32. The fiberizing holes 32 in the mid-portion of the annular sidewall 30 are between 0.016 and 0.035 inches in diameter. Preferably, as schematically shown in FIG. 4, an upper region of the mid-portion of the annular spinner disc sidewall 30 has larger diameter fiberizing holes 32 than a lower region of the mid-portion of the annular sidewall and fewer fiberizing holes 32 per unit area than the lower region of the mid-portion of the annular sidewall to facilitate the formation of primary fibers 34 across the height of the mid-portion having diameters in a narrower diameter range. In addition, to strengthen the spinner disc sidewall 30 and increase spinner disc service life, the spinner disc sidewall 30 is provided with a plurality of circumferentially spaced apart reinforcing bands 30' that extend through the mid-portion of the sidewall from the upper to lower annular edge portions of the sidewall. These reinforcing bands 30' are solid (do not contain fiberizing holes 32), and uninterrupted throughout their heights from the upper to the lower annular edge portions of the sidewall 30.

In a preferred embodiment of the invention, a stream of molten glass 33 (from a furnace source not shown) is introduced into an interior of the spinner disc 23 and onto the base plate 29 of the spinner disc radially inward of the annular spinner disc sidewall 30 at a rate between 120 pounds per hour and 900 pounds per hour. Lower molten glass throughputs are used when making glass fiber mats used to fabricate smaller outside diameter, thin walled, pieces of tubular pipe insulation. Higher molten glass throughputs are used when making glass fiber mats used to fabricate larger outside diameter, thick walled, pieces of tubular pipe insulation. To reduce raw material costs, less expensive glass compositions are used in the process of the subject invention than those normally used in rotary glass fiberization operations. However, the molten glass 33 of these less expensive glass compositions has a viscosity of at least 1000 poise at about 1900° F. and typically, a viscosity of at least 1000 poise at 1950° F. and a glass liquidus of about 1620° F. or greater up to about 1690° F. The use of these glass compositions, which are more viscous than the glass compositions normally used in other rotary fiberizing operations to produce products such as but not limited to residential insulation, introduces issues into the fiberization process that are addressed by the process of the subject invention, such but not limited to, minimizing any increased energy requirements for drawing this more viscous glass into fibers and maintaining a desired glass throughput per fiberizing hole while not raising operating temperatures to the extent that the spinner alloy is adversely affected to materially reduce spinner service life.

The spinner disc 23 is rotated about its generally vertical axis of rotation at speeds that centrifuge the molten glass 33 through the fiberizing holes 32 in the annular spinner disc sidewall 31 to form primary glass fibers 34 and to pass the primary fibers through an annular heat bath region 35 into an annular fluid attenuation region 36. Preferably the molten glass 33 is centrifuged through the fiberizing holes 32 with a force between 900 and 1300 G's (where G is the "gravitational constant" $3.44 \times 10^{-8}$ ft$^4$/lbf-sec$^4$ or $6.672 \times 10^{-11}$ N·m$^2$/kg$^2$) and at an average rate that is between 0.015 and 0.060 pounds per hour per fiberizing hole 32 and typically between about 0.04 and about 0.05 pounds per hour per fiberizing hole 32.

The annular heat bath region 35 includes and extends in height from at least the upper edge portion down through at least the mid-portion of the annular spinner disc sidewall 30 and radially outward from the outer surface of the spinner disc sidewall 30 to the annular fluid attenuation region 36. The annular external burner 24 heats the annular heat bath region 35 and is located immediately above the annular heat bath region 35. The annular external burner 24 heats the annular heat bath region 35 with relatively low momentum, high temperature (e.g. above 2100° F.) gases of combustion that are introduced from above into the annular heat bath region 35 to provide a net heat flux into the primary glass fibers 34 passing from the spinner disc 23 fiberizing holes through the annular heat bath region 35 into the annular attenuation fluid region 36. By having a net heat flux into the primary glass fibers 34 passing through the annular heat bath region 35, the viscosity of the primary glass fibers 34 is reduced during their passage through the annular heat bath region 35 and the introduction of these reduced viscosity primary fibers 34 into the annular fluid attenuation region 36 enables a greater attenuation or elongation of the primary glass fibers 34 into lesser diameter fibers in the annular fluid attenuation region 36.

The use of relatively low momentum gases of combustion to heat the annular heat bath region 35, reduces the degree of fiber entanglement of adjacent primary glass fibers 34 in the annular heat bath region 35 and decreases the formation of unwanted "shot" or fine glass debris from the primary glass fibers 34 in the annular heat bath region to thereby improve the cleanliness and quality of the glass fibers and the mat formed from the glass fibers produced by the subject invention. The momentum of the gases of combustion in the annular heat bath region 35 are controlled to reduce glass fiber networking as the primary glass fibers 34 pass through the annular heat bath region 35 so that in combination with the other fiber network reduction measures used in the process of the subject invention, a glass fiber mat is produced by the subject invention that separates as required in the cross machine direction to form mat sections having relatively straight feathered leading and trailing edges that extend perpendicular to or substantially perpendicular to the machine direction of the mat and are without or substantially without stringers that extend beyond the edges for more than four inches and typically the edges are without stringers that extend beyond the edges for more than three inches.

In one preferred embodiment of the annular external burner 24, the annular external burner 24 has an annular combustion chamber 37 that is lined with a high temperature resistant refractory lining 38. The annular combustion chamber 37 is sized to permit expansion of the gases of combustion within the chamber and prior to the discharge of the gases of combustion from the exterior burner 24 through the annular discharge orifice 39 to reduce the momentum of the gases of combustion discharged through the annular discharge orifice 39. The high temperature resistant refractory lining 38 of the external burner 24 reduces energy loss from the external burner 24 into the fiberizer frame structure (not shown) and creates an interior combustion chamber surface which envelops the combustion space of the burner to provide a radiant high temperature surface that facilitates combustion of the premixed fuel mixture introduced into the chamber and the maximum practical thermal extraction of energy from the gases of combustion produced in the chamber for use in the fiberizing process. The annular discharge orifice 39 is a relatively wide annular discharge orifice 39 that is located above and extends radially outward from the outside surface of the spinner disc sidewall 30. Preferably, the premixed fuel mixture is injected into the combustion chamber 37 of the external burner 24 through an inlet port or ports 40 (such as shown in FIG. 5) so that the premixed fuel mixture has a circumferential circulation pattern within the combustion chamber 37 where the premixed fuel mixture is burned to form the gases of combustion. These gases of combustion are then discharged downward into the annular heat bath region 35 through the relatively wide annular discharge orifice 39. Preferably, the relatively wide annular discharge orifice 39 is sufficiently wide, radially, to ensure that the primary glass fibers 34 are bathed in the low momentum, high temperature gases of combustion discharged from the external burner 24 for the entire or substantially the entire radial distance of their passage from the spinner disc sidewall 30 to the annular fluid attenuation region 36.

To introduce more heat into a region above the spinner disc 23 and into the annular heat bath region 35 as well as heat the interior of the spinner disc 23, a fuel mixture having less oxygen than required for full combustion of the fuel within the spinner disc, can be introduced into the interior of the spinner disc 23 through one or more internal burners 41. Typically, the fuel mixture would be an air deficient (compared to the stoichiometric ratio) natural gas mixture where the ratios range between 5:1 and 12:1. The higher ratios would be used for lower pull rates where it is more difficult to maintain a sufficiently high disc temperature for good fiberization. Typically, the flow rates and fuel mixture ratios used by the different internal burners 41 would differ depending on where the different burners are located and the directions in which the different burners are aimed. Typically, the internal burners 41 would not be refractory lined. However, in specific locations one or more of the small internal burners 41 could be refractory lined to maximize, to the extent practical, the thermal energy extracted for the process at strategic location (s). The internal burners 41 would each operate at low flow rates that would generally be lower than 2000 scfh (2000 standard cubic feet per hour) and as low as 500 scfh (500 standard cubic feet per hour). The combustion of this fuel mixture within the spinner disc 23 heats the interior of the spinner disc to keep the molten glass 33 within the spinner disc at a sufficiently high temperature for good fiberization and the fuel that does not burn within the spinner disc 23 spills out over the upper peripheral reinforcing flange 31 of the spinner disc where it combusts to add heat to a region over and adjacent the spinner disc including the annular heat bath region 35.

The annular fluid attenuation region 36 is spaced radially outward from the spinner disc sidewall 30 and extends in height at least from the upper edge portion down through at least the mid-portion of the annular spinner disc sidewall. An attenuation fluid is forcefully emitted from above into the annular fluid attenuation region 36. The forcefully emitted attenuation fluid attenuates the primary glass fibers 34 introduced into the annular fluid attenuation region 36 into lesser diameter glass fibers 42 having diameters between 5 microns and 8 microns and typically between about 6 and about 7 microns. The forcefully emitted attenuation fluid also directs those lesser diameter glass fibers 42 downward away from the spinner disc 23 toward the rotary collection drum 21 in a generally tubular veil 43 of the lesser diameter glass fibers 32 and fiber networks formed from a portion of the lesser diameter glass fibers 32.

The forcefully emitted attenuation fluid is emitted in a generally downward direction at a relatively high velocity from above into the annular fluid attenuation region 36. In a preferred embodiment of the subject invention, the forcefully emitted attenuation fluid is emitted from the annular fiber attenuation apparatus 25 having a continuous annular slit, a series of annularly spaced-apart discrete jets, or a series of annularly spaced-apart slits (semi continuous slits) 45. The forcefully emitted attenuation fluid can be emitted into the annular fluid attenuation region 36 in a variety of patterns and angles to provide the final force for pulling and attenuating the still-molten primary glass fibers 34 into the lesser diameter glass fibers 42, which have diameters that are greatly reduced from the diameters of the primary glass fibers 34. The attenuating fluid is typically air. However, other attenuating fluids such as but not limited to steam could be used to attenuate the primary glass fibers 34 in the annular fluid attenuation region.

Where the annular fiber attenuation apparatus 25, forcefully emits the attenuation fluid downward into the annular attenuation region 36 in a variety of patterns and/or angles to provide the final force for pulling and attenuating the still-molten primary glass fibers 34 into the lesser diameter glass fibers 42, the flow of the forcefully emitted attenuation fluid in the patterns and angles imparted by the jets or slits can be used to disperse the lesser diameter glass fibers and decrease the otherwise high concentration of the lesser diameter glass fibers 42 in the generally tubular veil 43 of lesser diameter glass fibers. If the lesser diameter glass fibers 42, which are otherwise in extremely close proximity to each other, are not dispersed by spreading the fibers generally radially inward or outward (fiber dispersion) from the generally tubular fiber veil 43 with the forcefully emitted attenuation fluid and/or other fiber dispersing means discussed below, the high concentration of the lesser diameter glass fibers 42 in the generally tubular fiber veil 43 will entangle and accumulate into ever larger and longer fiber networks. If permitted to form, these larger and longer fiber networks are collected along with the lesser diameter glass fibers 42 to form a less uniform glass fiber mat that, when pulled apart to form mat sections later on in the process, does not readily separate into mat sections with leading and trailing feathered edges that are substantially straight (regular) with no or substantially no fibrous stringers extending beyond the feathered edges of the mat a distance greater than four inches and typically no fibrous stringers extending beyond the feathered edges of the mat a distance greater than about three inches.

In addition to the forcefully emitted attenuation fluid, oxygen or an oxygen rich fluid mixture can be forcefully injected from above into and combusted in the annular fluid attenuation region 36 to effect a relatively high localized temperature increase in a portion of the annular fluid attenuation region 36 where there are high rates of shear attenuating the primary glass fibers 34 into the lesser diameter glass fibers 42. In a preferred embodiment of the subject invention, the forcefully injected oxygen or oxygen rich fluid mixture is forcefully injected into the annular fluid attenuation region 36 from an annular manifold 46 having a continuous annular slit, a series of annularly spaced-apart discrete jets, or a series of annularly spaced-apart slits (semi continuous slits) 47. Preferably, there is an adjustable annular air gap 48 between the annular manifold 46 and the annular attenuation apparatus 25 through which a selected volume of air is drawn into the heat bath region 35 and attenuation region 36 to promote combustion within these regions.

The rotary fiberizing apparatus 20 has a fiberizing and attenuation region where the molten glass 33 is introduced into the spinner disc 23 and passes through the fiberizing holes 32 in the spinner disc sidewall 30 to be fiberized into the primary glass fibers 34 and where the primary glass fibers thus formed are attenuated into the lesser diameter glass fibers 42. The spinner disc 23; the annular external burner 34 which is above, overlaps, and extends radially outward from the spinner disc 23; the annular attenuation apparatus 25 which is located radially outward from the spinner disc 23 and extends from above a plane containing the upper surface of the reinforcing flange 31 of the spinner disc downward to a height substantially coinciding with or below a horizontal plane containing the base plate 29 of the spinner disc 29; and the annular oxygen manifold 46 which is located intermediate and extends, except for a narrow annular air gap 48, between the external burner 34 and the attenuation apparatus 25, all function as a mechanical barrier to enclose and contain energy in the fiberizing and attenuation region of the process to maintain this region within a desired temperature range to facilitate the fiberization of the molten glass 33 while conserving energy. Preferably, to further enclose this fiberizing and attenuation region and maintain this region within a desired temperature range while conserving energy, a high temperature resistant radiant or refractory insulating plate 49 is located immediately above the spinner disc 23. The radiant or refractory insulating plate 49 extends from the hollow drive shaft 28 radially outward beyond the spinner disc 23, has a central opening through which the hollow drive shaft 28 for the spinner disc passes, and a second opening, located radially outward from the central opening, through the stream of molten glass 33 passes from the source of molten glass onto the base plate 29 of the spinner disc 23. The annular oxygen manifold 46 can be contained within the refractory plate 49.

To further contain energy in and/or add energy to the spinner disc 23 in the fiberizing and attenuation region of the process to maintain this region within a desired temperature range to facilitate fiberization of the molten glass 33, a high temperature resistant, refractory insulator plate or radiant insulator plate 50 can be secured to the bottom surface of the spinner disc base plate 29 to contain heat within the spinner disc 23 and/or the spinner disc base plate 29 can be heated by an annular induction heater 51. Preferably, the refractory insulating plate 50 is substantially coextensive with the bottom surface of the spinner disc base plate 29. Preferably, the annular induction heater 51 is located immediately below and adjacent the outer peripheral edge portion of the bottom surface of the spinner disc base plate 29 to input energy into this portion of the spinner disc base plate 29. The overall energy balance of this fiberizing and attenuation region can also be facilitated by introducing of the stream of molten glass 33 onto the spinner disc base plate 29 radially outward from the center of the spinner disc and as close as practical to the spinner disc sidewall 30 to minimize the area of the spinner disc base plate 29 that is wetted by the molten glass 33.

Figure 3:
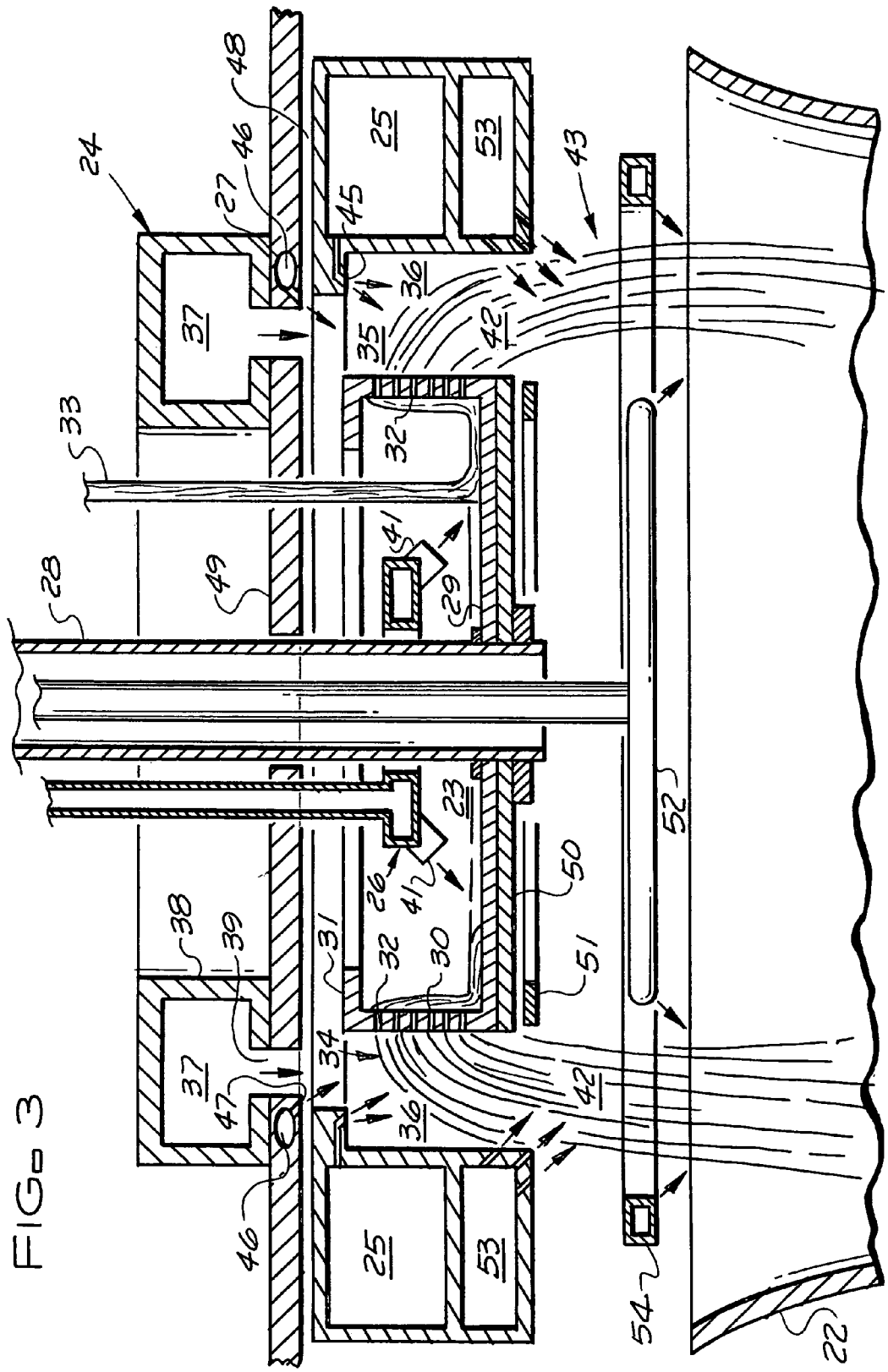
FIG. 3 is a schematic vertical cross section, on a larger scale, of the rotary fiberizing apparatus of FIG. 2.

As discussed above, preferably, the lesser diameter glass fibers 42 of the tubular fiber veil 43 are dispersed inwardly and/or outwardly in generally radial directions by forcefully applying fluid onto the veil. This generally radial dispersion of the lesser diameter glass fibers 42 in the tubular fiber veil 43 reduces the formation of larger and long fiber networks from the lesser diameter glass fibers that can form stringers in the mat collected on the perforated rotary collection drum 21 and cause that mat to be less uniform in density. As discussed above in connection with the attenuation apparatus 25, this dispersion of the lesser diameter glass fibers 42 can be accomplished, at least in part, by forcefully emitting the attenuating fluid from the attenuating apparatus 25 into the annular fluid attenuation region 36 at alternating angles and/or in a non-uniform pattern. This general dispersion of the lesser diameter glass fibers 42 in the tubular fiber veil 43 can also be accomplished, at least in part, by forcefully applying a binder and/or other fluid to the lesser diameter glass fibers 42 of the tubular fiber veil 43 from within and/or outside of the tubular fiber veil at a location or locations beneath the annular fluid attenuation region 36. Furthermore, all of these methods of fiber dispersion can be utilized together to obtain the desired amount dispersion of lesser diameter glass fibers 42 and can be combined with the use of a forming tube 22 specifically configured to effect fiber dispersion.

Where binder(s) and/or other fluid(s) are forcefully applied to the tubular fiber veil 43 from within the veil, the binder(s) and/or other fluid(s) are typically applied to the tubular fiber veil 43 by an interior fluid application apparatus 52 that is located beneath the spinner disc 23 and either above or in the upper portion of the forming tube 22. The binder(s) and/or other fluid(s) that are applied to the veil 43 from within the veil are supplied under pressure to the interior fluid application apparatus 52 through the hollow drive shaft 28. To apply binder(s) to and/or disperse the lesser diameter glass fibers 42, the interior fluid application apparatus 52 forcefully emits the binder(s) and/or other fluid(s) outward toward the interior of the tubular fiber veil 43 from one or more series of annularly arranged jets (such as liquid pressure or air-atomized binder nozzles commonly used in the industry), one or more annular slits, and/or one or more series of annularly arranged spaced apart slits of the application apparatus 52. Preferably, the binder(s) and/or other fluid(s) forcefully emitted by the application apparatus 52 are applied to the lesser diameter glass fibers 42 of the tubular fiber veil 43 by introducing the binder(s) and/or other fluids into the tubular fiber veil 43 along the entire or substantially entire inner circumference of the tubular fiber veil. The impact of the fluid(s) emitted by the fluid application apparatus 52 on the lesser diameter glass fibers 42 of the tubular fiber veil 43 disperses the lesser diameter glass fibers 42 of the tubular fiber veil 43 in generally outward directions from the veil and where the fluid(s) are binder(s) applies the binder(s) to the fibers.

Where binder(s) and/or other fluid(s) are forcefully applied to the tubular fiber veil 43 from outside of the veil, the binder (s) and/or other fluid(s) are typically applied to the tubular fiber veil 43 by one or more exterior fluid application apparatuses that are located to forcefully emit fluids on and into the veil 43 at a level or levels beneath the spinner disc 23 and either above or in the upper portion of the forming tube 22. FIGS. 2 and 3 show an embodiment of the invention that utilizes a first exterior fluid application apparatus 53 that is integral with and located immediately beneath the annular attenuation apparatus 25 and a second exterior fluid application apparatus 54 that is located between the first exterior fluid application apparatus 53 and the forming tube 22. The binder(s) and/or other fluid(s) are supplied under pressure to the exterior fluid application apparatuses 53 and 54. To apply binder(s) to and/or disperse the lesser diameter glass fibers 42 of the veil, the exterior fluid application apparatuses 53 and 54 forcefully emit the binder(s) and/or other fluid(s) inward toward the exterior of the tubular fiber veil 43 from one or more series of annularly arranged jets (such as liquid pressure or air-atomized binder nozzles commonly used in the industry), one or more annular slits, and/or one or more series of annularly arranged spaced apart slits of the application apparatuses 53 and 54. Preferably, the binder(s) and/or other fluid(s) forcefully emitted by the application apparatuses 53 and 54 are applied to the lesser diameter glass fibers 42 of the tubular fiber veil 43 by introducing the binder(s) and/or other fluids into the tubular fiber veil 43 along the entire or substantially entire outer circumference of the tubular fiber veil. The impact of the fluid(s) emitted by the fluid application apparatuses 53 and 54 on the lesser diameter glass fibers 42 of the tubular fiber veil 43 disperses the lesser diameter glass fibers 42 of the tubular fiber veil 43 in generally inward directions from the veil and where the fluid(s) are binder(s) applies the binder(s) to the fibers. It is contemplated that any one of the individual application apparatuses 52, 53, and 54 can be used alone or that two or more of the application apparatuses 52, 53, and 54 can be used together in various combinations.

Binder(s) can also be applied to the tubular fiber veil 43 from outside of the veil by one or more exterior fluid application apparatuses that are located to forcefully emit fluids on and into the veil at a level or levels between the lower end of the forming tube 22 and the perforated rotary collection drum 21 or in the lower portion of the forming tube 22. FIG. 2 shows an embodiment of the invention that utilizes an exterior fluid application apparatus 55 that is located between the lower end of the forming tube 22 and the perforated rotary collection drum. The binder(s) and/or other fluid(s) are supplied under pressure to the exterior fluid application apparatus 55. To apply binder(s) to the lesser diameter glass fibers 42 of the veil, the exterior fluid application apparatus 55 forcefully emits the binder(s) inward toward the exterior of the tubular fiber veil 43 from one or more series of annularly arranged jets (such as liquid pressure or air-atomized binder nozzles commonly used in the industry), one or more annular slits, and/or one or more series of annularly arranged spaced apart slits of the application apparatus 55. Preferably, the binder(s) forcefully emitted by the application apparatus 55 are applied to the lesser diameter glass fibers 42 of the tubular fiber veil 43 by introducing the binder(s) into the tubular fiber veil 43 along the entire or substantially entire outer circumference of the tubular fiber veil.

The forming tube 22 has an annular horizontal cross section, typically a generally circular horizontal cross section, for its entire or substantially its entire height. The forming tube 22 extends for the greater part of the distance between the rotary fiberizing apparatus 20 and the perforated rotary collection drum 21 and typically extends for substantially the entire distance between the rotary fiberizing apparatus 20 and the perforated rotary collection drum 21. The forming tube 22 functions to contain the tubular fiber veil 43 and to reduce the accumulation of the lesser diameter glass fibers 42 on the exterior fluid application apparatuses 53, 54, and 55. In addition, the forming tube 22 can be configured to slow the velocity and/or descent of the lesser diameter glass fibers 42 in the tubular fiber veil 43 or otherwise control the movement of the lesser diameter glass fibers in the tubular veil as the lesser diameter glass fibers pass from the rotary fiberizing apparatus 20 to the perforated rotary collection drum 21. This fiber control is used to reduce the formation of fiber networks in the fiber veil 43, improve fiber collection on the perforated rotary collection drum 21, and improve mat quality by enabling the collection of a mat 108 on the collection surface of the perforated rotary collection drum 21 that is more uniform in thickness and density throughout and contains fewer and shorter fiber networks. By way of example, this fiber control may be carried out by an appropriate selection of: a) the horizontal cross sectional area or areas of the forming tube 22 at its upper inlet end, upper portion, mid-portion, lower portion, and/or lower outlet end, b) the height (length) of the forming tube, c) the spacing between the upper end of the forming tube and the bottom of the rotary fiberizing apparatus, and/or d) the spacing between the lower end of the forming tube and the collection surface of the rotary collection drum 21. The horizontal cross sectional areas of the forming tube 22 used to control fiber movement in the fiber veil 43 may include variations in the horizontal cross sectional areas along the height of the forming tube to form diverging and converging sections along the height of the forming tube, e.g. a forming tube that has upper and lower diverging portions that are joined by a converging mid-portion. Fiber movement in the fiber veil 43 is typically controlled to slow the velocity and descent of the lesser diameter glass fibers toward the perforated rotary collection drum: a) to provide more time for purposely changing the trajectory of the fibers and fiber networks of the veil and thereby enable a better dispersion of the fibers and fiber networks in the veil by the various fiber dispersion apparatus or apparatuses used in the process and a reduction in the size and length of fiber networks formed in the veil; b) to require less collection airflow down through the perforations of the rotary collection drum 21 to collect and retain the fibers and fiber networks of the veil on the collection surface of the rotary collection drum 21; c) to pass the fibers and fiber networks of the veil more slowly past the binder application apparatus or apparatuses to improve the application of binder to the fibers and fiber networks; and d) to ensure that the veil is made sufficiently turbulent to generate a more even or uniform collection of the fibers and fiber networks of the veil on the collection surface of the perforated rotary collection drum 21 for improved mat quality. While a perforated rotary collection drum 21 is a preferred collection surface for collecting the insulation mat 108, the collection surface for collecting the insulation mat 108 could also be formed by a continuous perforated conveyor belt or other collection surface (not shown).

Figure 6:
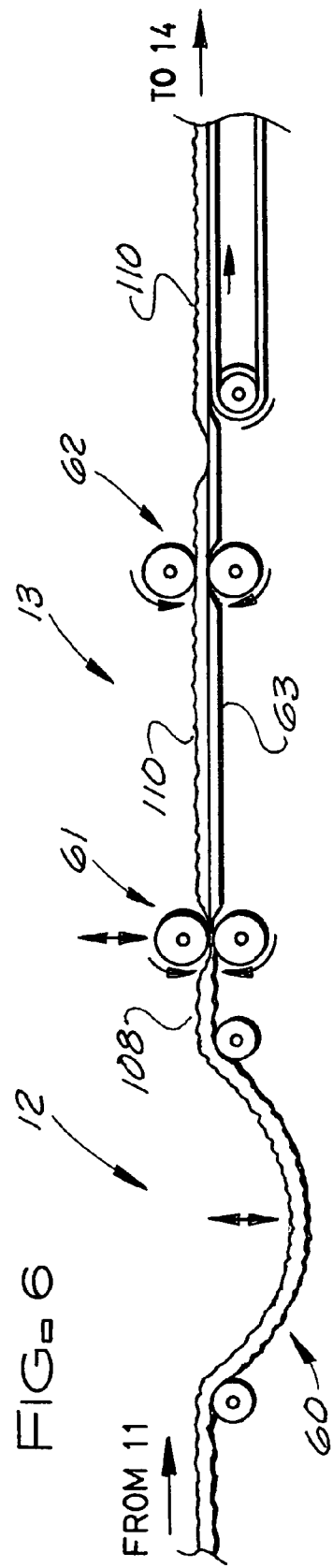
FIG. 6 is a schematic side view of the take-up and mat section forming stations of the process of the subject invention.

The lesser diameter glass fibers are collected on a collection surface of the rotary collection drum 21 into an insulation mat 108 that is typically between 25 and 40 grams per square foot. The insulation mat 108 exhibits the following properties: a) the insulation mat 108, with its binder uncured, exhibits sufficient strength to enable the insulation mat 108 to be suspended and accelerated without tearing while passing through the surge loop 60 of the take-up station 12; b) when the insulation mat 108 is pulled apart by longitudinally directed, opposing forces applied substantially equally to the mat across the width of the mat, the mat separates across the width of the mat into two mat sections at a separation that has generally straight, feathered edges extending perpendicular to or substantially perpendicular to the longitudinal centerline of the mat (perpendicular to the machine direction); and c) when the insulation mat 108 is separated in accordance with b), the edges of the mat sections 110 formed by the mat separation are not only feathered, but have no or substantially no fibrous stringers (formed by fiber networks) extending beyond either of the feathered edges of the mat sections 110 a distance greater than about four inches and typically no fibrous stringers extending beyond either of the feathered edges of the mat sections 110 a distance greater than about three inches. While it is preferred to have a single gravity surge loop 60 in the take-up station 12 as shown in FIG. 6 (rather than a plurality of surge loops) to reduce the stresses applied to and any degradation of the insulation mat, it is contemplated that the take-up station could have more than one surge loops.

After the insulation mat 108 is collected on the perforated rotary collection drum 21, the insulation mat 108 is fed through the surge loop 60 of the take-up station 12 where the insulation mat 108 is alternately suspended, accumulated, and then accelerated to accommodate the formation of the mat sections 110 in the mat section forming station 13 while the insulation mat 108 is continuously fed from the perforated rotary collection drum into the take-up station 12. The mat section forming station 13 includes an upstream pair of pull and pinch rolls 61, a downstream pair of pull rolls 62 and a mat supporting plate or conveyor 63 intermediate the upstream pair of pinch rolls 61 and the downstream pair of pull rolls 62. The plate or conveyor 63 supports the insulation mat 108 as the insulation mat is fed through the mat section forming station 13 from the upstream pair of pull and pinch rolls 61 to the downstream pair of pull rolls 62 and supports the mat sections 110 as the mat sections are formed in the mat section forming station 13. The pair of pull and pinch rolls 61 and the pair of pull rolls 62 both extend transversely with respect to the machine direction (transversely with respect to the longitudinal centerline of the insulation mat 108) and across the entire width of the insulation mat 108 so that the pairs of rolls 61 and 62 grip the insulation mat 108 as it passes through the pairs of rolls across the entire width of the mat. Periodically, the rotations of the pull and pinch rolls 61 are momentarily stopped and the rolls 61 are brought together to pinch the mat 108 between the rolls 61 across its entire width while the pair of pull rolls 62 continue to rotate, grip, and pull the insulation mat 108. When this occurs the insulation mat 108 is pulled apart by longitudinally directed, opposing forces applied substantially equally to the insulation mat 108 across the entire width of the insulation mat by the nonrotating pair of pull and pinch rolls 61 and the rotating pair of pull rolls 62. These opposing forces cause the insulation mat 108 to separate at the nonrotating pair pull and pinch rolls 61 across the entire width of the insulation mat 108. The separation of the insulation mat 108 at the nonrotating pair of pull and pinch rolls 61 forms generally straight, feathered edges with no or substantially no fibrous stringers (formed by fiber networks) extending beyond either of the feathered edges a distance greater than about four inches and typically no fibrous stringers (formed by fiber networks) extending beyond either of the feathered edges a distance greater than about three inches. When the process is in its normal continuous operation, the feathered edge of the portion of the insulation mat 108 separated from the upstream portion of the insulation mat 108 by the pull and pinch rolls 61 forms a trailing feathered edge 112 of a mat section 110 formed in the mat section forming station 13 and the feathered edge of the upstream portion of the insulation mat 108 gripped by the pull and pinch rolls 61 forms the leading feathered edge 114 of the next mat section 110 formed in the mat section forming station 13.

After being formed in the mat section forming station 13, the mat sections 110 are successively fed into the mandrel wrapping station 14 and spirally wrapped about mandrels having generally cylindrical outer surfaces. The binder in the wrapped mat sections 110 is then cured in the curing station 15 to form pieces of tubular pipe insulation 120 with no longitudinally extending ridges and no or substantially no long stringers on the internal or external surfaces of the product that would adversely affect the product's insulating properties and/or appearance. The tubular pieces of pipe insulation 120 are then successively removed from the mandrels, slit longitudinally in the pipe insulation slitting station 16, jacketed in the pipe insulation jacketing station 17 to form jacketed tubular pipe insulation assemblies 122, and packaged in the packaging station 18 for storage, shipment, and handling.

Figure 8:
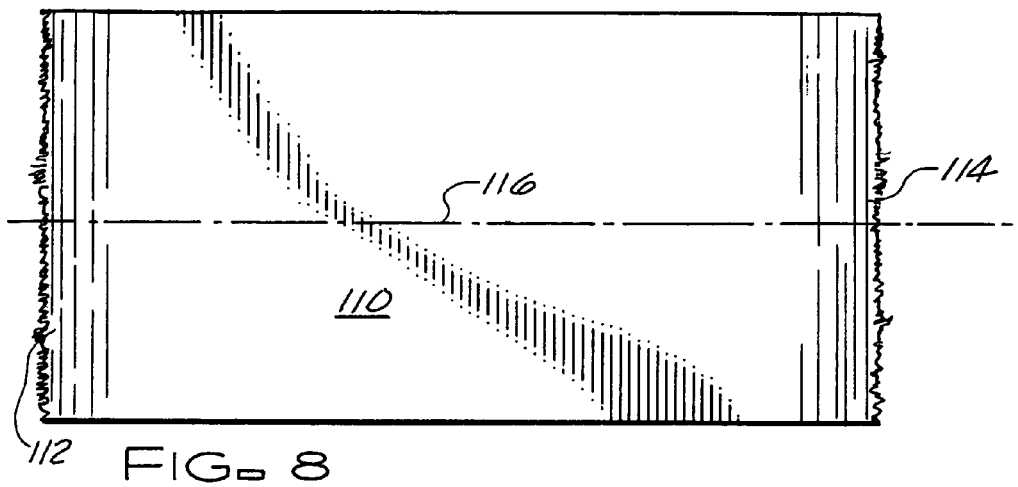

FIGS. 7 and 8 show a glass fiber mat section 110 formed by the process of the subject invention. As shown in FIGS. 7 and 8, the glass fiber mat section 110 has feathered trailing and leading edges 112 and 114. The trailing and leading edges 112 and 114 of the mat section 110 are generally straight and extend perpendicular to or substantially perpendicular to the longitudinal centerline 116 of the mat section 110. In addition, the trailing and leading edges 112 and 114 of the mat section 110 are generally regular and have no or substantially no fibrous stringers extending beyond either of the generally regular feathered edges of the mat section a distance greater than about four inches and typically no fibrous stringers extending beyond either of the generally regular feathered edges of the mat-section a distance greater than about three inches. With its generally straight and regular feathered edges with no long fibrous stringers, when the mat section 110 is spirally wrapped about a mandrel having a generally cylindrical outer surface and the binder in the spirally wrapped mat section is cured to form a piece of the tubular pipe insulation, there are no longitudinally extending ridges and no or substantially no long stringers on the internal or external surfaces of the product that adversely affect the product's insulating properties and/or appearance.

Figure 9:
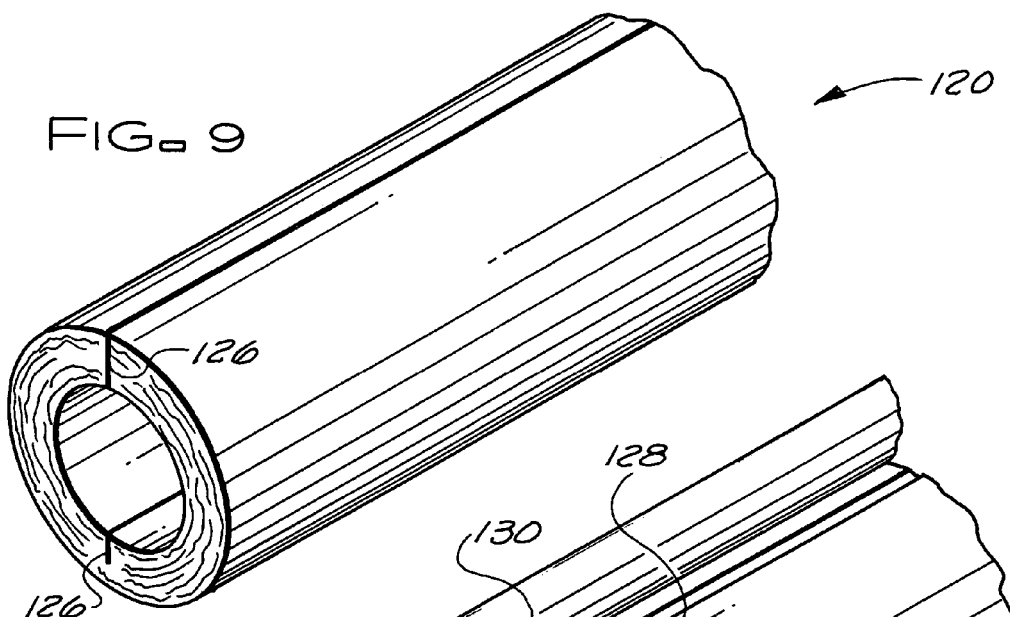
FIG. 9 is a partial perspective view of a slit piece of tubular glass fiber pipe insulation made by the process of the subject invention.
Figure 10:
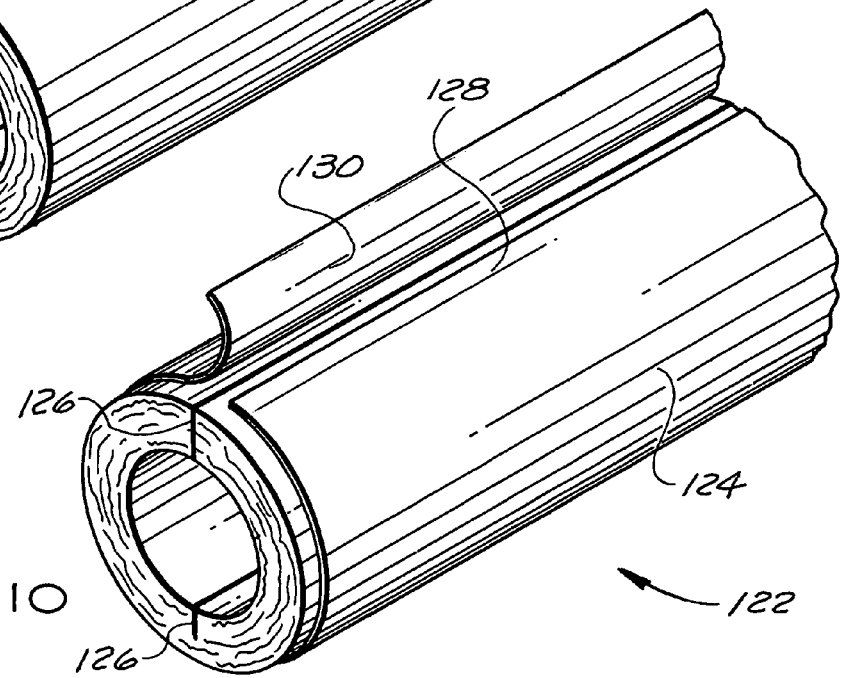
FIG. 10 is a partial perspective view of a piece of jacketed tubular glass fiber pipe insulation made by the process of the subject invention.

FIG. 9 shows a typical piece of tubular pipe insulation 120 and FIG. 10 shows a typical jacketed tubular pipe insulation assembly 122 made by the process of the subject invention. The jacketed tubular pipe insulation assembly 122 includes a tubular piece of pipe insulation 120 and a jacket 124. The jacketed tubular pipe insulation assembly 122 is commonly installed on the pipes of hot and cold piping systems to retard the flow of heat between the pipes of the system and the ambient environment and conserve energy. The tubular piece of pipe insulation 120 of the jacketed tubular pipe insulation assembly 122 has a longitudinally extending slit 126, formed in the slitting station 16, that passes completely through the tubular wall of the pipe insulation on one side and into the interior of and part of the way through the tubular wall of the pipe insulation on the opposite side of the pipe insulation so that the pipe insulation can be opened, passed over, and closed about a pipe. The jacket 124 of the jacketed pipe insulation assembly 122 is wrapped circumferentially about the tubular piece of pipe insulation 120 so that the longitudinal edge portion 128 of the jacket 124 and the sealing tab 130 of the jacket extend adjacent, parallel to and on opposite sides of the slit 126, but do not overlap the slit 126. Once the jacketed tubular pipe insulation assembly 122 is placed on a length of pipe, the sealing tab 130 can be placed over the slit 126 and adhesively sealed to the longitudinal edge portion 128 of the jacket 124 to seal the jacketed pipe insulation assembly 122 about the pipe. The tubular piece of pipe insulation 120 is jacketed to enhance the performance of the pipe insulation (e.g. to retard the transmission of water vapor); to prevent the pipe insulation from being exposed to contaminants; to make the pipe insulation more aesthetically pleasing; to protect the pipe insulation from adverse climatic conditions; and to serve as a means for securing and sealing the tubular pipe insulation assembly 122 in place on the pipes of a piping system. The tubular piece of pipe insulation 120 and hence the jacketed tubular pipe insulation assembly 122 typically range in length from about 36 inches (about 0.92 m) to about 48 inches (about 1.22 m), and range in outside diameter between about 2 inches (about 50 mm) and about 23 inches (about 600 mm).

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A process of making a glass fiber mat for formation into tubular pipe insulation, comprising:
   utilizing a rotary glass fiberization apparatus comprising:
      a spinner disc, the spinner disc having a round base and annular peripheral sidewall extending upward from a peripheral edge of the base; the annular peripheral sidewall having an upper annular edge portion, a lower annular edge portion, and a mid-portion extending between the upper and lower annular edge portions; the mid-portion of the sidewall having thousands of glass fiberization holes therein between 0.016 and 0.035 inches in diameter;
      drive means for rotating the spinner disc about a generally vertical axis of rotation;
      molten glass source means for introducing a molten glass into an interior of the spinner disc and onto the base of the spinner disc radially inward of the annular peripheral sidewall of the spinner disc;
      external combustion burner means for heating an annular heat bath region with low momentum gases of combustion wherein the annular heat bath region extends from the upper edge portion down through the mid-portion of the annular sidewall of the spinner disc and extends radially outward from the sidewall of the spinner disc substantially to an annular fluid attenuation region;
      attenuation fluid emitting means for forcefully emitting an attenuating fluid from above into the annular fluid attenuation region; the annular fluid attenuation region being spaced radially outward from the spinner disc sidewall and extending from the upper edge portion down through the mid-portion of the annular sidewall of the spinner;
      air passage means for allowing air to enter into the annular heat bath and annular fluid attenuation regions to promote combustion therein; and
      gas emitting means for injecting oxygen into the annular fluid attenuation region without passing through the spinner disc;
   introducing molten glass from the molten glass source means, at a rate between 120 pounds per hour and 900 pounds per hour, into the interior of the spinner disc and onto the base of the spinner disc radially inward of the annular peripheral sidewall of the spinner disc; the molten glass having viscosity of at least 1000 poise at about 1900° F. and a glass liquidus of about 1620° F. or greater;
   rotating the spinner disc to centrifuge the molten glass through the glass fiberization holes in the annular peripheral sidewall of the spinner disc to form primary glass fibers and to pass the primary fibers through the annular heat bath region into the annular fluid attenuation region;
   injecting a fuel mixture into a combustion chamber of the external combustion burner means so that the fuel mixture has a circumferential circulation pattern within the combustion chamber;
   burning the fuel mixture within the combustion chamber of the external combustion burner means;
   permitting expansion of the gases of combustion within the combustion chamber to reduce momentum of the gases of combustion;
   heating the annular heat bath region with the low momentum gases of combustion from the external combustion burner means to provide a net heat flux into the primary glass fibers passing through the annular heat bath region, wherein a discharge orifice of the external combustion burner means is sized to allow the low momentum gases of combustion to bathe the primary glass fibers along a radial distance between the annular peripheral sidewall of the spinner disc and the annular fluid attenuation region, so as to reduce the viscosity of the primary glass fibers as they pass through the annular heat bath region;
   allowing a selected volume of air to enter through the air passage means and into the annular heat bath region and the annular fluid attenuation region to promote combustion therein;
   injecting oxygen or an oxygen rich fluid mixture out of the gas emitting means from above the annular fluid attenuation region into the annular fluid attenuation region without passing through the spinner disc to effect a relatively high localized temperature increase in a portion of the annular fluid attenuation region where there are high rates of shear attenuating the primary glass fibers into the lesser diameter glass fibers;
   attenuating the primary glass fibers with the attenuating fluid forcefully emitted from the attenuation fluid emitting means, forming lesser diameter glass fibers, having diameters between 5 microns and 8 microns, in the annular fluid attenuation region, and directing the lesser diameter glass fibers downward away from the spinner disc with the attenuating fluid emitted from the attenuation fluid emitting means as a generally tubular veil of the lesser diameter glass fibers and fiber networks formed from a portion of the lesser diameter glass fibers;
   dispersing the lesser diameter glass fibers of the tubular veil of lesser diameter glass fibers by forcefully applying fluid onto the veil to reduce in length the fiber networks formed from the lesser diameter glass fibers;
   applying binder to the lesser diameter glass fibers; and
   collecting the lesser diameter glass fibers into an insulation mat having a length and a width; the mat having a physical property that when the mat is pulled apart by longitudinally directed, opposing forces applied substantially equally to the mat across the width of the mat, the mat separates across the width of the mat into two mat sections at a separation that has feathered edges with substantially no fibrous stringers extending beyond either of the feathered edges for a distance greater than about four inches.

2. The process of making glass fiber mat according to claim 1, comprising:
   collecting the lesser diameter glass fibers into an insulation mat that weighs between 25 and 40 grams per square foot.

3. The process of making glass fiber mat according to claim 1, comprising:

centrifuging the molten glass through the glass fiberization holes in the sidewall of the spinner disc at a rate that is between 0.015 and 0.060 pounds per hour per glass fiberization hole.

4. The process of making glass fiber mat according to claim 1, comprising:
centrifuging the molten glass through the glass fiberization holes in the sidewall of the spinner disc with a force between 900 and 1300 G's.

5. The process of making glass fiber mat according to claim 1, wherein:
an upper region of the mid-portion of the annular sidewall of the spinner disc has larger diameter holes than a lower region of the mid-portion of the annular sidewall of the spinner disc and fewer holes per unit area than the lower region of the mid-portion of the annular sidewall of the spinner disc.

6. The process of making glass fiber mat according to claim 5, wherein:
the annular sidewall of the spinner disc has circumferentially spaced-apart bands, without fiberization holes therein, extending between the upper portion and the lower portion of the annular sidewall of the spinner disc for strengthening the annular sidewall of the spinner disc.

7. The process of making glass fiber mat according to claim 1, comprising:
emitting gases of combustion from the external combustion burner means into the annular heat bath region at a temperature of 2100° F. or above.

8. The process of making glass fiber mat according to claim 1, comprising:
emitting the attenuating fluid from the attenuation fluid emitting means into the annular fluid attenuation region at alternating angles and/or in a non-uniform pattern to disperse the lesser diameter glass fibers and reduce in length the fiber networks formed from the lesser diameter glass fibers.

9. The process of making glass fiber mat according to claim 1, comprising:
emitting the attenuating fluid from the attenuation fluid emitting means into the annular fluid attenuation region in a non-uniform pattern to disperse the lesser diameter glass fibers and reduce in length the fiber networks formed from the lesser diameter glass fibers.

10. The process of making glass fiber mat according to claim 1, comprising:
containing heat within the annular heat bath region and the annular fluid attenuation region with barrier means located above the annular heat bath region and the annular fluid attenuation region and radially outward from the spinner axis of rotation relative to the annular fluid attenuation region.

11. The process of making glass fiber mat according to claim 10, wherein the barrier means comprises a refractory insulating plate located above the spinner disc.

12. The process of making glass fiber according to claim 11, wherein the gas emitting means comprises an annular manifold, and wherein the annular manifold is contained within the refractory insulating plate.

13. The process of making glass fiber mat according to claim 1, comprising:
dispensing a fuel mixture having less oxygen than required for full combustion of the fuel into the interior of the spinner disc and heating the interior of the spinner disc and, by fuel spill over, a region over and adjacent the spinner disc through the combustion of the fuel mixture and fuel of the fuel mixture.

14. The process of making glass fiber mat according to claim 1, comprising:
heating the spinner base from below the spinner base through inductive heating.

15. The process of making glass fiber mat according to claim 1, comprising:
insulating a bottom side of the spinner base to retain heat in the spinner base.

16. The process of making glass fiber mat according to claim 1, wherein:
the binder is applied to the lesser diameter glass fibers of the tubular veil of lesser diameter glass fibers from within and/or outside of the tubular veil.

17. The process of making glass fiber mat according to claim 1, comprising:
the binder is forcefully applied to the lesser diameter glass fibers of the tubular veil of lesser diameter glass fibers from within and/or outside of the tubular veil to apply binder to the lesser diameter glass fibers, disperse the lesser diameter glass fibers, and reduce in length the fiber networks formed from the lesser diameter glass fibers.

18. The process of making glass fiber mat according to claim 1, comprising:
dispersing the lesser diameter glass fibers of the tubular veil of lesser diameter glass fibers by forcefully applying fluid onto the veil from within and/or outside of the veil to disperse the lesser diameter glass fibers and reduce in length the fiber networks formed from the lesser diameter glass fibers.

19. The process of making glass fiber mat according to claim 1, wherein:
the molten glass having a viscosity of at least 1000 poise at about 1950° F.

20. The process of making glass fiber mat according to claim 1, comprising:
slowing the velocity of the lesser diameter glass fibers in the tubular veil of lesser diameter glass fibers intermediate the annular fluid attenuation region and a rotary collection drum where the lesser diameter glass fibers are collected to form the insulation mat.

21. The process of making glass fiber mat according to claim 1, comprising:
slowing the velocity of the lesser diameter glass fibers in and creating turbulence in the tubular veil of lesser diameter glass fibers intermediate the annular fluid attenuation region and a rotary collection drum where the lesser diameter glass fibers are collected to form the insulation mat by passing the tubular veil of lesser diameter glass fibers through a forming tube located intermediate the annular fluid attenuation region and the rotary collection drum that has an upper end below the annular fluid attenuation region, a lower end above the rotary collection drum, and a transverse cross section that varies intermediate the upper and lower ends of the forming tube and is intermediate the upper and lower ends of the forming tube.

22. The process of making glass fiber mat according to claim 1, wherein the gas emitting means comprises an annular manifold, the attenuation fluid emitting means comprises an annular attenuation apparatus, and the air passage means comprises an adjustable air gap disposed between the annular manifold and the annular attenuation apparatus.

23. A process of making tubular pipe insulation, comprising:

utilizing a rotary glass fiberization apparatus comprising:
a spinner disc, the spinner disc having a round base and annular peripheral sidewall extending upward from a peripheral edge of the base; the annular peripheral sidewall having an upper annular edge portion, a lower annular edge portion, and a mid-portion extending between the upper and lower annular edge portions; the mid-portion of the sidewall having thousands of glass fiberization holes therein between 0.016 and 0.035 inches in diameter;
drive means for rotating the spinner disc about a generally vertical axis of rotation;
molten glass source means for introducing a molten glass into an interior of the spinner disc and onto the base of the spinner disc radially inward of the annular peripheral sidewall of the spinner disc;
external combustion burner means for heating an annular heat bath region with gases of combustion wherein the annular heat bath region extends from the upper edge portion down through the mid-portion of the annular sidewall of the spinner disc and extends radially outward from the sidewall of the spinner disc substantially to an annular fluid attenuation region;
attenuation fluid emitting means for forcefully emitting an attenuating fluid from above into the annular fluid attenuation region; the annular fluid attenuation region being spaced radially outward from the spinner disc sidewall and extending from the upper edge portion down through the mid-portion of the annular sidewall of the spinner;
air passage means for allowing air to enter into the annular heat bath and annular fluid attenuation regions to promote combustion therein; and
gas emitting means for injecting oxygen into the annular fluid attenuation region without passing through the spinner disc;
introducing molten glass from the molten glass source means, at a rate between 120 pounds per hour and 900 pounds per hour, into the interior of the spinner disc and onto the base of the spinner disc radially inward of the annular peripheral sidewall of the spinner disc; the molten glass having viscosity of at least 1000 poise at about 1900° F. and a glass liquidus of about 1620° F. or greater;
rotating the spinner disc to centrifuge the molten glass through the glass fiberization holes in the annular peripheral sidewall of the spinner disc to form primary glass fibers and to pass the primary fibers through the annular heat bath region into the annular fluid attenuation region;
injecting a fuel mixture into a combustion chamber of the external combustion burner means so that the fuel mixture has a circumferential circulation pattern within the combustion chamber;
burning the fuel mixture within the combustion chamber of the external combustion burner means;
permitting expansion of the gases of combustion within the combustion chamber to reduce momentum of the gases of combustion;
heating the annular heat bath region with the low momentum gases of combustion discharged downward into the annular heat bath region from a discharge orifice of the external combustion burner means to provide a net heat flux into the primary glass fibers passing through the annular heat bath region, wherein the discharge orifice of the external combustion burner means is sized to allow the low momentum gases of combustion to bathe the primary glass fibers along a radial distance between the annular peripheral sidewall of the spinner disc and the annular fluid attenuation region, so as to reduce the viscosity of the primary glass fibers during passage through the annular heat bath region;
allowing a selected volume of air to enter through the air passage means and into the annular heat bath region and the annular fluid attenuation region to promote combustion therein;
injecting oxygen or an oxygen rich fluid mixture out of the gas emitting means from above the annular fluid attenuation region into the annular fluid attenuation region without passing through the spinner disc to effect a relatively high localized temperature increase in a portion of the annular fluid attenuation region where there are high rates of shear attenuating the primary glass fibers into the lesser diameter glass fibers;
attenuating the primary glass fibers with the attenuating fluid emitted from a jet or slit of the attenuation fluid emitting means, forming lesser diameter glass fibers, having diameters between 5 microns and 8 microns, in the annular fluid attenuation region, and directing the lesser diameter glass fibers downward away from the spinner disc with the attenuating fluid emitted from the attenuation fluid emitting means as a generally tubular veil of the lesser diameter glass fibers and fiber networks formed from a portion of the lesser diameter glass fibers;
dispersing the lesser diameter glass fibers of the tubular veil of lesser diameter glass fibers by forcefully applying fluid onto the veil to reduce in length the fiber networks formed from the lesser diameter glass fibers;
collecting the lesser diameter glass fibers into an insulation mat having a length and a width; the mat having a physical property that when the mat is pulled apart by longitudinally directed, opposing forces applied substantially equally to the mat across the width of the mat, the mat separates across the width of the mat into two mat sections at a separation that has feathered edges with substantially no fibrous stringers extending beyond either of the feathered edges for a distance greater than about four inches;
pulling the mat apart by longitudinally directed, opposing forces applied substantially equally to the mat across the width of the mat and separating the mat separates across the width of the mat into a leading mat section and a trailing mat section; and
wrapping the leading mat section about a mandrel having a generally cylindrical outer surface to form a tubular piece of pipe insulation.

24. The process of making tubular pipe insulation according to claim 23, wherein the gas emitting means comprises an annular manifold, the attenuation fluid emitting means comprises an annular attenuation apparatus, and the air passage means comprises an adjustable air gap disposed between the annular manifold and the annular attenuation apparatus.

25. A process of making a glass fiber mat for formation into tubular pipe insulation, comprising:
utilizing a rotary glass fiberization apparatus comprising:
a spinner disc, the spinner disc having a round base and annular peripheral sidewall extending upward from a peripheral edge of the base; the annular peripheral sidewall having an upper annular edge portion, a lower annular edge portion, and a mid-portion extending between the upper and lower annular edge portions; the mid-portion of the sidewall having thousands of glass fiberization holes therein between 0.016 and 0.035 inches in diameter;

drive means for rotating the spinner disc about a generally vertical axis of rotation;

molten glass source means for introducing a molten glass into an interior of the spinner disc and onto the base of the spinner disc radially inward of the annular peripheral sidewall of the spinner disc;

external combustion burner means for heating an annular heat bath region with low momentum gases of combustion wherein the annular heat bath region extends from the upper edge portion down through the mid-portion of the annular sidewall of the spinner disc and extends radially outward from the sidewall of the spinner disc substantially to an annular fluid attenuation region;

attenuation fluid emitting means for forcefully emitting an attenuating fluid from above into the annular fluid attenuation region; the annular fluid attenuation region being spaced radially outward from the spinner disc sidewall and extending from the upper edge portion down through the mid-portion of the annular sidewall of the spinner; and air passage means for allowing air to enter into the annular heat bath and annular fluid attenuation regions to promote combustion therein; and gas emitting means for injecting oxygen into the annular fluid attenuation region without passing through the spinner disc;

introducing molten glass from the molten glass source means, at a rate between 120 pounds per hour and 900 pounds per hour, into the interior of the spinner disc and onto the base of the spinner disc radially inward of the annular peripheral sidewall of the spinner disc; the molten glass having viscosity of at least 1000 poise at about 1900° F. and a glass liquidus of about 1620° F. or greater;

rotating the spinner disc to centrifuge the molten glass through the glass fiberization holes in the annular peripheral sidewall of the spinner disc to form primary glass fibers and to pass the primary fibers through the annular heat bath region into the annular fluid attenuation region;

injecting a fuel mixture into a combustion chamber of the external combustion burner means so that the fuel mixture has a circumferential circulation pattern within the combustion chamber;

burning the fuel mixture within the combustion chamber of the external combustion burner means;

permitting expansion of the gases of combustion within the combustion chamber to reduce momentum of the gases of combustion;

heating the annular heat bath region with the low momentum gases of combustion discharged downward into the annular heat bath region from a discharge orifice of the external combustion burner means to provide a net heat flux into the primary glass fibers passing through the annular heat bath region, wherein the discharge orifice of the external combustion burner means is sized to allow the low momentum gases of combustion to bathe the primary glass fibers along a radial distance between the annular peripheral sidewall of the spinner disc and the annular fluid attenuation region, so as to reduce the viscosity of the primary glass fibers during passage through the annular heat bath region;

allowing a selected volume of air to enter through the air passage means and into the annular heat bath region and the annular fluid attenuation region to promote combustion therein;

injecting oxygen or an oxygen rich fluid mixture out of the gas emitting means from above the annular fluid attenuation region into the annular fluid attenuation region without passing through the spinner disc to effect a relatively high localized temperature increase in a portion of the annular fluid attenuation region where there are high rates of shear attenuating the primary glass fibers into the lesser diameter glass fibers;

attenuating the primary glass fibers with the attenuating fluid forcefully emitted from a jet or slit of the attenuation fluid emitting means, forming lesser diameter glass fibers, having diameters between 5 microns and 8 microns, in the annular fluid attenuation region, and directing the lesser diameter glass fibers downward away from the spinner disc with the attenuating fluid emitted from the attenuation fluid emitting means as a generally tubular veil of the lesser diameter glass fibers and fiber networks formed from a portion of the lesser diameter glass fibers;

dispersing the lesser diameter glass fibers of the tubular veil of lesser diameter glass fibers by forcefully applying fluid onto the veil to reduce in length the fiber networks formed from the lesser diameter glass fibers;

applying binder to the lesser diameter glass fibers; and collecting the lesser diameter glass fibers into an insulation mat having a length and a width; the mat having a physical property that when the mat is pulled apart by longitudinally directed, opposing forces applied substantially equally to the mat across the width of the mat, the mat separates across the width of the mat into two mat sections at a separation that has feathered edges with substantially no fibrous stringers extending beyond either of the feathered edges for a distance greater than about four inches.

26. The process of making glass fiber mat for formation into tubular pipe insulation according to claim 25, wherein the gas emitting means comprises an annular manifold, the attenuation fluid emitting means comprises an annular attenuation apparatus, and the air passage means comprises an adjustable air gap disposed between the annular manifold and the annular attenuation apparatus.

\* \* \* \* \*